United States Patent
Brown

(10) Patent No.: US 8,061,184 B2
(45) Date of Patent: Nov. 22, 2011

(54) METHOD AND SYSTEM FOR MONITORING GAS LEAKS BY AMPLIFICATION OF FLOW

(76) Inventor: Geoffrey P. Brown, Vancouver (CA)

(*) Notice: Subject to any disclaimer, the term of this patent is extended or adjusted under 35 U.S.C. 154(b) by 408 days.

(21) Appl. No.: 12/353,102

(22) Filed: Jan. 13, 2009

(65) Prior Publication Data

US 2010/0175461 A1 Jul. 15, 2010

Related U.S. Application Data

(60) Provisional application No. 61/021,392, filed on Jan. 16, 2008.

(51) Int. Cl.
*G01M 3/26* (2006.01)

(52) U.S. Cl. ............... 73/40; 73/40.5 R; 73/46

(58) Field of Classification Search ............. 73/40–49.8
See application file for complete search history.

(56) References Cited

U.S. PATENT DOCUMENTS

| | | | | |
|---|---|---|---|---|
| 2,675,816 A | * | 4/1954 | Giannette | 137/80 |
| 3,187,558 A | * | 6/1965 | Koncen et al. | 73/25.03 |
| 3,583,842 A | * | 6/1971 | Hancock et al. | 431/16 |
| 3,874,224 A | * | 4/1975 | Smith | 73/40 |
| 4,066,095 A | * | 1/1978 | Massa | 137/486 |
| 4,259,080 A | * | 3/1981 | Wunderlin | 436/7 |
| 4,437,336 A | | 3/1984 | Abe | |
| 4,895,018 A | * | 1/1990 | Asbra | 73/40.5 R |
| 4,984,448 A | * | 1/1991 | Jordan et al. | 73/40.5 R |
| 5,046,519 A | | 9/1991 | Stenstrom et al. | |
| 5,267,587 A | | 12/1993 | Brown | |
| 5,269,171 A | * | 12/1993 | Boyer | 73/40.5 R |
| 5,272,646 A | * | 12/1993 | Farmer | 702/51 |
| 5,295,392 A | * | 3/1994 | Hensel et al. | 73/49.5 |
| 5,568,825 A | | 10/1996 | Faulk | |
| 5,859,363 A | * | 1/1999 | Gouge | 73/40.7 |
| 5,866,802 A | | 2/1999 | Kimata et al. | |
| 6,116,082 A | | 9/2000 | Pride | |
| 6,164,319 A | | 12/2000 | Cochran et al. | |

FOREIGN PATENT DOCUMENTS

| | | | | |
|---|---|---|---|---|
| JP | 55066729 A | * | 5/1980 | |
| JP | 57194341 A | * | 11/1982 | |
| JP | 60066128 A | * | 4/1985 | |
| JP | 04042030 A | * | 2/1992 | |

* cited by examiner

*Primary Examiner* — David A. Rogers
(74) *Attorney, Agent, or Firm* — Oyen Wiggs Green & Mutala LLP

(57) ABSTRACT

A method to amplify the pressure effects of very small flows, or very small leaks, in contained fluid systems, and the effects of small leaks in fluid systems that have small flows such as would occur in a combustible gas system with lighted pilot lights or a contained water system with a drip watering system, while not affecting the normal operation of such fluid systems, and without interfering with the function of such small flows.

4 Claims, 2 Drawing Sheets

METHOD AND SYSTEM FOR MONITORING GAS LEAKS BY AMPLIFICATION OF FLOW

REFERENCE TO RELATED APPLICATION

The present application claims the benefits, under 35 U.S.C. §119(e), of U.S. Provisional Applications Ser. No. 61/021,392 filed Jan. 16, 2008 entitled "Method and System for Monitoring Gas Leaks By Amplification of Flow" which is incorporated herein by this reference.

TECHNICAL FIELD

The invention relates to the field of monitoring of fluid flow systems for leaks and more particularly methods of amplifying the effects of very small flows that occur in the supply pipe of contained fluid systems that have very small leaks.

BACKGROUND

Various systems and methods of testing have been developed that shut a valve in the supply pipe to a contained fluid system and measure the decay of a signal detected by a pressure sensor over time, to determine the rate at which a system is leaking, or gas is flowing. This typically requires a full range pressure sensor to avoid over-pressurizing the sensor and to allow moderate to larger flows to be more accurately detected, and this makes such systems inherently less sensitive.

Systems have also been developed using various flow amplification measurement methods. Such methods include using a Venturi with a differential, pressure transducer, or a smaller bypass pipe through which all flow is directed. These arrangements amplify the dynamic pressure signal by increasing the velocity of flow in the smaller diameter section. Since dynamic pressure, or equal drop in static pressure, varies as the square of velocity, the signal is amplified by the greater velocity in the contracted section, and the sensitivity increased. In the case of a Venturi, or any other differential flow measuring means, a more sensitive flow measurement means can be used because it does not have to withstand the full static pressure range, but only the dynamic pressure, which is equal to the drop in static pressure, caused by flow.

Typically flow measuring devices, and particularly, pressure transducer devices, have a temperature compensation signal conditioner, and the more accurate the compensation, the higher the price of the transducer. However, even very expensive sensors do not have sufficient signal resolution for measurement of very small flows. Such sensors are typically limited to a small percentage of maximum pressure range for reasonable accuracy. Consider a system where the maximum flow in a pipe is 5 ft/sec, amplified to 10 ft/sec by a Venturi contraction. The pressure is proportional to velocity squared, or 100. If the flow is 0.5 ft/sec the pressure is proportional to 1, or about the range of accuracy of a sophisticated sensor with fullscale set for the dynamic pressure range from a flow of 5 ft/sec. Suppose the velocity is 0.05 ft/sec, which would mean a sizeable leak, the pressure is proportional to 0.01, which is one thousandth of the transducer range. The transducer signal from such pressure change is less than the random pressure fluctuations in the pipe, and is well outside the manufacturer's tolerance, hysteresis and temperature variation of the pressure sensor, which typically exceeds 1%. The measurements can no longer be relied upon, and will be unable to provide a meaningful reading for lesser fluid flows from still smaller leaks.

In considering a leak detection system for a residential gas system, both price and accuracy are important. It is also necessary not to interfere with the normal use of the gas system, nor to have the device or test procedure extinguish any pilot light that may exist in the gas system. A small leak must be detected on top of the pilot light flow without extinguishing the pilot light, and the pilot light flow is already below the noise and the component manufacturer's tolerance level of the most sophisticated flow measurement devices, even when they are mounted in flow amplification devices as described above.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present method is independent of the basic physical flow amplification means or flow measuring means employed by a leak detection, or flow measurement, device, and would apply equally to inventions with flow amplification as described above, regardless of whether they use pressure transducers, Doppler shift, deflection devices or any other flow measurement means.

The present method addresses this issue by amplifying the pressure signal from a small leak by several orders of magnitude, depending upon the information required, and whether a pre-existing flow is present in the distribution system. This method does not need sophisticated temperature compensated measuring devices, since the method can be used by flow measuring devices to determine if a signal is actually due to a small flow or leak, and eliminate temperature, pressure, hysteresis and any other variations that the flow measurement means may have, despite such variations being within the manufacturer's tolerance. Any flow measuring device using this method can measure, process and store information in the non-volatile memory of a processor, and use this information to correct any future measurements for component manufacturing variations, and temperature and pressure drift. In addition, pressure signals unique to any installation can be stored in the non-volatile memory of a device for future comparative reference. Such a signal could typically be the signature of one, or several, pilot lights that are installed in a residential or commercial gas system.

The invention relates to a method for amplifying the effects of very small flows that occur in the supply pipe of contained fluid systems that have very small leaks, and the additional flow that occurs when a small leak occurs in a contained fluid system with a small steady flow such as would occur with a pilot light in a combustible residential or commercial gas system, or a drip watering system in a residential or commercial water system, without having to interrupt the normal operation of the small steady flow, which in the case of a combustible gas system with a pilot light, would result in the pilot light being extinguished.

The present invention provides a method to amplify the pressure signals from extremely small flows associated with very small leaks in a contained fluid system, and a method to amplify the pressure signals from small leaks on top of small steady flows in such systems.

The invention provides a method of monitoring or detecting small gas or liquid leaks by amplifying flow at the means for sensing flow in a system for monitoring or detecting small gas or liquid leaks where the system comprises:
 a) valve means for opening and closing the fluid supply line;
 b) control means for controlling the valve means;
 c) means for sensing a flow within the supply line;
 d) means for processing data from sensing means; and
 e) means for storing processed data in non-volatile memory in the control means.

The invention provides a method of monitoring or detecting small gas or liquid leaks in a gas or liquid supply system having a pilot light comprising the steps of:
 a) at a time when the system is leak-free, undertaking a quick valve open-valve closed test to determine whether there is a flow in the pipe other than due to the pilot light;
 b) if there is no flow in the pipe other than due to the pilot light, obtaining a signature of the flow in the pipe due to the pilot light by closing the valve means in the supply line for a period short enough not to extinguish the pilot light, opening the valve and measuring the fluid flow signature due to the pilot light;
 c) storing the signature of the flow due to the pilot light in memory;
 d) later when it is desired to test for leaks, a quick valve open-valve closed test is undertaken to determine whether there is a flow in the pipe other than due to the pilot light;
 e) if there is no flow in the pipe other than due to the pilot light, a measurement of the flow in the pipe is obtained by closing the valve means in the supply line for a period short enough not to extinguish the pilot light, and then opening the valve and measuring the fluid flow;
 f) the measured flow is then compared to the stored pilot signature flow to determine if a leak exists.

The invention further provides a method to amplify the pressure effects of very small flows, or very small leaks, in contained fluid systems, and the effects of small leaks in fluid systems that have small flows such as would occur in a combustible gas system with lighted pilot lights or a contained water system with a drip watering system, while not affecting the normal operation of such fluid systems, and without interfering with the function of such small flows.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
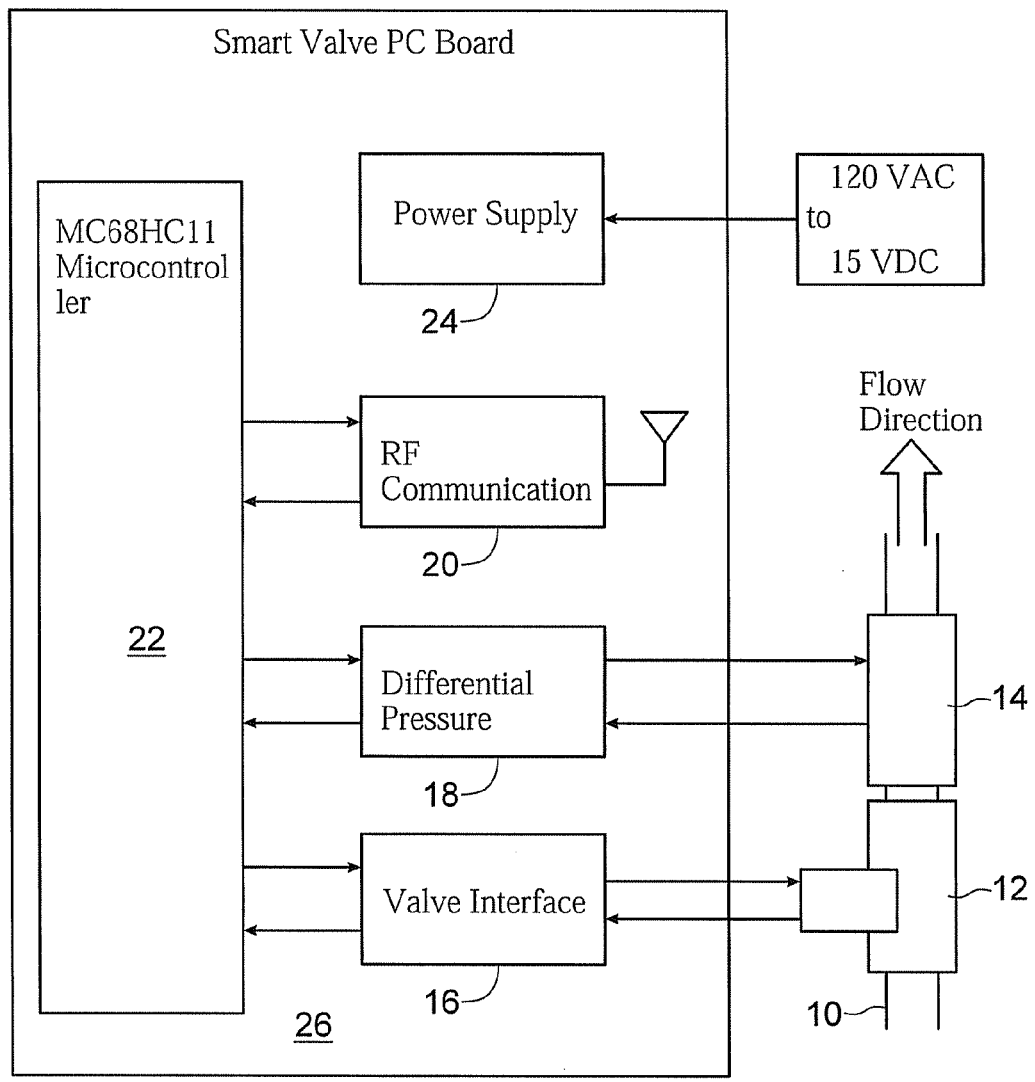
FIG. 1 is a schematic of the embodiment used in testing the method.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The present method allows the pressure signal from very small, steady flows to be amplified, allowing measurement and recording of the signature of such small steady flows, in order that such stored data can be used for comparative purposes at later scheduled, or operator initiated tests, for the purpose of determining if a small flow exists in addition to such small steady flow. The present method is applicable to any device that measures flow, and is applicable to both compressible fluids and non-compressible fluids.

Residential houses and commercial premises are generally serviced by a water supply line and a gas supply line. Various devices exist to determine if such systems have leaks. These devices frequently use static pressure within the supply line, or the change in static pressure resulting from a dynamic pressure change created by a physical flow amplification technique, and time, to measure the magnitude and/or decay in pressure, thereby determining the magnitude of the flow or leak. Such flow measurement devices often include a valve to close off the supply system, enabling the static pressure in the system downstream of the valve to be monitored, and the static pressure decay of a known flow measured, or if it is large enough to be above the noise threshold of the measuring device, can measure the instantaneous value of the change in dynamic pressure. However, as discussed previously, a pilot light sized flow, or drip watering system, is below such threshold, and the magnitude of flow cannot be determined by such devices. Since such small pre-existing flows cannot be measured accurately, it is not possible to measure for a small leak that may exist in addition to such small flows.

Devices using differential measurement to determine flow levels are inherently more accurate than devices measuring only static pressure. Total head static pressure measuring devices generally need to be of a larger range than differential devices, to protect them from over-pressure, and to ensure they are able to accurately measure moderate to large flows, and measurements from such devices cannot easily be corrected for temperature, pressure or manufacturer's tolerance because there is no way of knowing whether an output signal is due to such variances, or is a real signal. With differential devices, which can be characterized as real time measuring devices, measurement depends on the value of the dynamic or velocity pressure, which is measured instantaneously. In addition, the fullscale range of differential devices is usually smaller, due to the smaller signal being measured, and the lower likelihood of over-pressure occurring, making devices using them inherently more sensitive. Further, in the present method, the sensitivity of the device is not degraded by temperature, pressure or sensor manufacturing tolerance variations, or variations in other components of the flow measurement device, because the method allows the device to determine whether a signal is from a small flow, or is due to some other anomaly not related to a small flow. Other than the added capability for differential measuring means of being able to negate temperature, pressure and manufacturer's variation effects, the present method applies equally to devices with single port static pressure measuring means.

Firstly, consider a contained gas system with no outlet flow, except possibly for a leak of a bubble every couple of seconds, when observed by a soapy water test. When a valve is closed in the supply pipe to a contained gas system with such a bubble leak, static pressure devices are typically not going to be able to determine the leak in a relevant time period, for the reasons discussed above, particularly if the surrounding air temperature or gas system temperature is rising or falling, which a residential household gas pipe is likely to do depending upon whether cold gas from buried distribution pipes has been flowing in the pipe, or not, or the sun is shining on the pipe. The apparent signal due to such temperature change alone is typically several orders of magnitude greater than the signal being sought. Since there is virtually no flow associated with such a small leak, differential dynamic pressure change devices, even amplified by a Venturi or bypass technique, do not give a meaningful signal. The same temperature drift and manufacturing anomaly argument for the static pressure device is equally applicable to the direct reading of such a differential pressure device.

Figure 2:
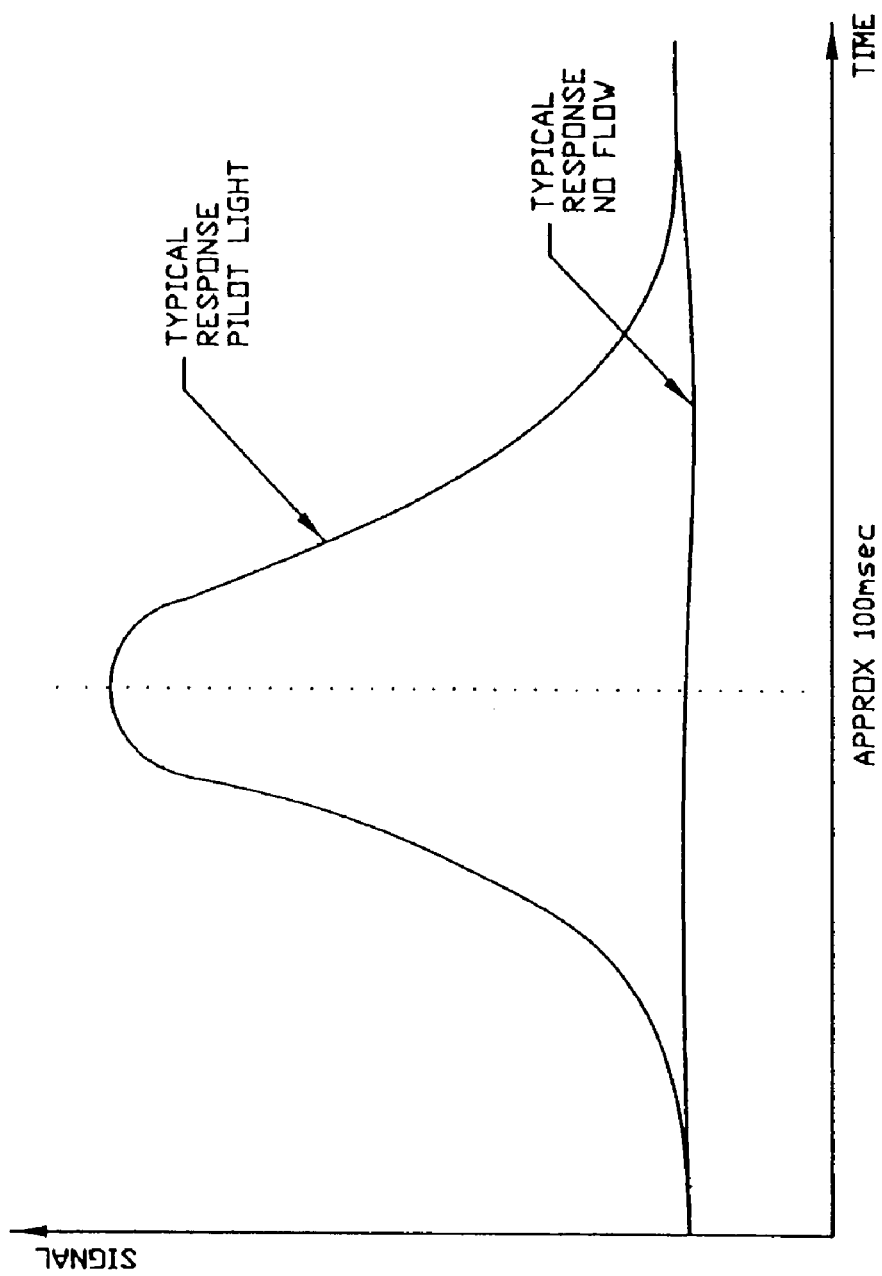
FIG. 2 is a schematic of a typical pressure signal versus time after a valve is opened.

If however, the valve is closed for a small finite period of the order of 60 seconds, and then opened, one will get a very small recharging flow, which creates a dynamic pressure at the measuring device. This dynamic pressure is equal to the drop in static pressure, which for pressure transducer devices is the signal being measured. Any change in signal indicates a leak. Temperature and measuring means component manufacturing variations are irrelevant. If there is no signal, there is no leak. This means a contained system can be determined to be leak free, or, can be determined to have a leak which is below a preset threshold set at the time the flow measurement device is manufactured, and which is regarded as acceptable to a utility company. Sophisticated temperature and pressure compensated flow measurement means are not required, and manufacturing tolerances only matter in so much as they are calibrated into the signature of the particular installation for each device as explained below. This allows the use of non-temperature and pressure compensated flow measurement devices, which significantly lowers the cost of the measuring devices. For a residential or commercial gas system, the gas distribution system can quickly be tested to be leak free. If a pilot light is then lit in such a leak-free tested system, there exists a contained gas system with a small relatively steady flow. If the valve in the feeder pipe to such a residential gas system with a pilot light is closed for a small finite period of the order of 5 seconds, and then opened, the gas will flow into the piping system to replace the gas burnt through the pilot light while the valve was closed. There is no danger of extinguishing the pilot light, as dwellings typically have enough gas in the piping system to maintain the pilot light for in excess of 60 seconds. With separation of the valve and measuring device of a few inches, the measuring device typically experiences a rising signal that peaks approximately 100 msecs after the valve is opened, and then returns to its level before the valve was closed. This is the signature of this device in this house with this distribution system, and this, or these, pilot lights. FIG. 2 shows a typical representation of the pressure signal verses time. The peak of the signal can be recorded, or for greater accuracy readings can be taken at small constant time periods while the signal passes the measuring device, and the area under the pulse determined by multiplying the instantaneous readings by the length of the time interval, and summing the results. Such summation of the area under the pulse is more accurate, because the variation in summed area of the same steady flow on gas systems of different sizes is greater than the percentage variation of the difference in the peak values of the same signals.

This test is a repeatable signature, and can be used at any future time to check for leaks in the contained gas system with pilot light, or lights. Depending upon the devices used, flow measuring means employed, and analysis techniques, this method can dependably detect leaks as small as 10% of a pilot light flow level on top of a typical pilot light flow.

At any time, a quick valve close-valve open, in a time period of the order of 50 msecs, will generate a surge pulse at the measuring device, if gas is flowing in the supply pipe. Although, the means for measuring flow of the measuring device may indicate a flow exists in the gas supply line, as discussed previously, drift and other anomalies can give a signal that indicates to the measuring device, that a sizeable flow exists in the pipe, when in fact there is no flow. This effect is particularly difficult to detect if a flow in the pipe has developed slowly over a period of time. By undertaking this quick valve close-valve open test, the surge pulse, or lack thereof, enables the device to determine whether there is actually a flow in the pipe, and whether the device can safely undertake a leak test without putting out a pilot light, as would be the case where the small steady flow was a pilot light in a contained gas system. Shutting the valve for a small finite time of as little as a few seconds when a significant flow is present can quickly exhaust the gas from the gas system and put out a pilot light. Consequently, any leak detection device would not want to conduct tests for small leaks, using a shut-off valve, when gas is flowing in the gas system. Shutting the valve for 50 msecs has no effect on the gas system, the operation of any appliance, or the pilot light.

The invention provides a method of monitoring or detecting small gas or liquid leaks in a gas or liquid supply system having a pilot light comprising the following steps. At a time when the system is leak-free, a quick valve open-valve closed test is undertaken to determine whether there is a flow in the pipe other than due to the pilot light. If there is no flow in the pipe other than due to the pilot light, a signature of the flow in the pipe due to the pilot light is obtained by closing the valve means in the supply line feeder pipe for a period short enough not to extinguish the pilot light, and then opening the valve and measuring the fluid flow signature due to the pilot light. The signature of the flow due to the pilot light is stored in memory. Later when it is desired to test for leaks, a quick valve open-valve closed test is undertaken to determine whether there is a flow in the pipe other than due to the pilot light. If there is no flow in the pipe other than due to the pilot light, a measurement of the flow in the pipe is obtained by closing the valve means in the supply line feeder pipe for a period short enough not to extinguish the pilot light, and then opening the valve and measuring the fluid flow. The measured flow is then compared to the stored pilot signature flow to determine if a leak exists.

A contained liquid system behaves very similarly to the contained gas system described above, and the pressure signal signature of any steady flow, such as a drip water system can be equally retained and used for future comparison. The static pressures are generally much higher in a contained liquid system due to the incompressibility of liquid, being typically in the 30 to 70 psi range for residential and commercial water systems, depending upon supply pressure, demand and whether a pressure reducing valve is present in the supply pipe. However, similarly to the contained gas system, temperature, pressure, hysteresis and manufacturer's component variations of the flow measuring device have no effect on the capability of the measuring device's capability to reliably detect a signal, and repeat such test results at a later scheduled, or user initiated time.

In the embodiment of the test device, a leak as small as a single drip from a tap is detectable in a typical residential or commercial water system without any other flow. When the valve in the supply pipe to the contained water system, with such leak, is opened, the small pressure charging pulse passes into the water system, first passing the static pressure port and raising the pressure there, which gives a differential signal between the static pressure port and the dynamic pressure port. The pulse subsequently passes the dynamic pressure port and the differential signal returns to zero.

FIG. 1 shows a schematic diagram illustrating an embodiment of the system. A fluid supply line 10, such as a residential gas or water supply line, has a valve 12 and pressure sensor 14, which are controlled by a controller 22 mounted on printed circuit board 26. For example a MC68HC11 microcontroller manufactured by Motorola may be used. Valve 12 may be a solenoid valve manufactured by Fluid Control Division, Parker Hannifin. For a gas line, a Silicon Microstructures gas pressure transducer, model 5551 with an excitation of 1.50 mA @ 25 degreeC. may be used. Table 1 illustrates the specifications for the Silicon Microstructures gas pressure transducer, model 5551. Microcontroller 22 activates valve 12 through interface 16 and the change in pressure measured by transducer 14, as described above, is communicated to the microcontroller 22 by differential pressure interface 18. Microcontroller 22 is powered by power supply 24. Microcontroller 22 monitors the differential pressure change through periodic monitoring as described above and if a leak situation is calculated, communicates an alarm through RF communication channel 20.

The following algorithms are examples of an implementation of the foregoing system and method:

Symbol Definitions $P_{ref}$ The absolute reference pressure; this value does not change over time. All other pressure related values are corrected to remain relative to this constant. Currently, $P_{ref}$ is fixed at 0.

$P_{ac}$ The actual pressure reading, corrected for static pressure, temperature, hysteresis and other system variables.

$P_{chk}$ A reference value used during leak tests. This variable is used to hold the average pressure as it existed at the start of the leak test.

$P_{avg}$ This is the average pressure reading. Rather than storing all readings necessary to create an average of the last N elements, this value is computed as a weighted accumulation, adding a certain percentage of each new reading to the average.

$P_{max}$ This is the maximum value that the average pressure reading has achieved. Every time a sensor reading is performed $P_{max}$ is updated so that it always marks the highest average pressure. This value is used to determine if the pressure is falling.

$\Delta P_t$ This is the change in the pressure reading that must take place in order to trigger the system. This value is fixed at 0.1% of Vmax at installation time.

$\Delta P_{sg}$ This is the change in the pressure reading that must take place to be defined as a surge. This value is fixed at 1.0% of Vmax at installation time.

$V_{Pcr}$ The static pressure correcting equation result. This value is combined with the pressure reading to correct for static pressure errors.

$V_{Tcr}$ The environmental correcting equation result. This value is combined with the pressure reading to correct for dynamic, environmental errors such as temperature, hysteresis and mechanical wear.

Surge Leak Test

The surge leak test is performed by the system in response to a low pressure that has been perceived as a leak and has persisted for such a time as to trigger the system. If this test fails, a flow exists in the system. The controlling routine will perform this test once more, to confirm the leak, and will then shut the system down.

The algorithm follows:

$P_{chk}=P_{avg}$

Close the line valve
Wait for 5 seconds.
Open the line valve.
Wait for 2 seconds; during this time, pressure is monitored and a leak is determined to exist if $P_{ac}-P_{ref}>\Delta P_{sg}$ at any time.

Minute Leak Test

The minute leak test is performed by the system to verify the integrity of a line before recalibrating a sensor, entering a reading for the ECE equation or in response to a user request. It is used as a diagnostic tool to allow the homeowner to check for leaks that are too small to be detected by the surge test. If this test fails, a flow exists that is too small to justify shutting the system down, but large enough to warrant the homeowner's attention. The system will remain operational, but no sensor recalibrations will be allowed.

The algorithm follows:

Perform a normal surge test. This will prevent wasting time checking for a minute leak when a large leak may be erupting elsewhere in the system. If the surge test detects a leak, the minute leak test is aborted and the system responds as if an event has occurred (a confirmation test is run and the system is shut down).

$P_{chk}=P_{avg}$

Close the line valve
Wait for 2 minutes; this period is overridden if $P_{chk}-P_{ac}>\Delta P_t$ at any time. If an event or alert condition is detected the system opens the valve and the test is aborted. [The pressure readings during a MLT must be verified in a real system. It may be the case that not enough flow will occur with the valve closed to trigger an alert.]

Perform a second surge test. $P_{chk}$ is not reset to $P_{av}$ at the start of this test, but remains at the value set before the two minute time delay. This gives a much longer time for a leak to reduce the amount of water or gas in the system. If this test fails, the system will enter a holding state that can be left only through the occurance of an event. This state will not impede normal functioning other than to disable any sensor recalibration. The NORMAL LED will remaining flashing to alert the user to this condition.

Following a successful minute leak test, the system will recalibrate itself, if needed, by recalculating the constant coefficient, $A_T$, for the ECE.

Sensor Calibration

The person skilled in the at will understand that the following explanation of the sensor calibration equations is not an in depth analysis; it merely reflects the software implementation along with some background explanation. The pressure sensors in the invention are sensitive to static pressure, temperature, hysteresis, mechanical wear and other unwanted effects. These are removed from the dynamic pressure readings by applying two correcting equations: the Static Pressure Correcting Equation (SPCE) and the Environmental Correcting Equation (ECE). The SPCE corrects for the variation caused by static pressure. This correction is independent of temperature and other dynamic variables, which permits us to generate the coefficients of the equation one time only. The installing technician performs this as part of the normal installation routine. The ECE changes to adapt to the environment. Updating the ECE requires a leak test, so this equation is left alone until it is determined that the system is out of calibration.

Static Pressure Correcting Equation (SPCE)

The SPCE coefficients define a cubic equation. Although the static pressure error is parabolic in nature, a cubic equation is used to get more precision. The cubic equation characterizes the error introduced by static pressure changes. These coefficients are determined when the system is installed by solving four cubic equations. The data for the equation, $(E_0, V_0)$, $(E_1, V_1)$, $(E_2, V_2)$ and $(E_3, V_3)$, is collected by the installing technician right after the system has been powered up and the self diagnostics have run. These data points must be gathered while no flow exists in the system and the temperature remains constant. The SPCE data points are read from a decreasing static pressure curve (temperature remains constant). The static pressure curve can be shown as a graph. The point $(E_0, V_0)$, also referred to as $(E_{read}, V_{read})$, is retained forever as the absolute, unchanging reference point. The line $V_0$ is the reference pressure; all other pressure readings will be corrected to be relative to this line.

The invention will automatically go to the SPCE initialization state after power on diagnostics have successfully completed. This state is evident by the five flashing LEDs on the water portion of the device's front panel. [The gas system SPCE is entered in the same fashion as the water system and may be done at the same time. For brevity, only the water system is described, but the same method applies to both gas and water.] As data points are entered into the device, the LEDs will change from flashing to a steady on; one LED for each data point. When all data points have been entered, the NORMAL LED will still be flashing; this indicates that the controller is calculating the SPCE coefficients from the data points. When the coefficients have been generated, the NORMAL LED changes to a steady on, and the remaining LEDs are turned off. The system is then ready to operate.

The method for entering the coefficients follows:

With the valve open, the technician will adjust the household water pressure to 70 psi. He will then close the valve.

SENSOR ARM, VALVE OPEN, TRIGGER, ARMED and NORMAL LEDs are all flashing. The technician presses the <ALT> <WATER VALVE OPEN> keypad combination to enter the first data point. SENSOR ARM will change to a steady on to acknowledge the data entry.

The technician then releases a small amount of water by opening a faucet for a short period. An installation bib may be used to monitor the static pressure change. This reduces the static pressure to the point where the second reading is taken. The technician again presses the <ALT> <WATER VALVE OPEN> keypad combination to enter the second data point. VALVE OPEN will change to a steady on to acknowledge the data entry.

The technician releases another small amount of water and presses the <ALT> <WATER VALVE OPEN> keypad combination to enter the third data point. TRIGGER will change to a steady on to acknowledge the data entry.

The technician releases one last small amount of water and presses the <ALT> <WATER VALVE OPEN> keypad combination to enter the fourth, and last, data point. ARMED will change to a steady on to acknowledge the data entry.

At this point, all data is entered and the WAGtroll will calculate the SPCE coefficients. The NORMAL LED will change from flashing to a steady on when the system is functional—this will take approximately 10 seconds. Preferably a 10 second delay period is allowed after all equations are setup. This will let the average pressure and pulse disarm accumulator settle out before starting normal operation. If this is not done, the software may think an event is occurring and react appropriately which may give unexpected results.

SPCE Coefficient Generation

First, all data points are adjusted to the zero axis at $(E_0, V_0)$ $$E_0=0, V_0=0$$

$$E_1=E_1-E_0, V_1=V_1-V_0$$

$$E_2=E_2-E_0, V_2=V_2-V_0$$

$$E_3=E_3-E_0, V_3=V_3-V_0$$

Next, one solves the following equations to get values for $A_P$, $B_P$, $C_P$ and $D_P$.

$$V_0=A_P+B_P E_0+C_P E_0^2+D_P E_0^3$$

$$V_1=A_P+B_P E_1+C_P E_1^2+D_P E_1^3$$

$$V_2=A_P+B_P E_2+C_P E_2^2+D_P E_2^3$$

$$V_3=A_P+B_P E_3+C_P E_3^2+D_P E_3^3$$

With the knowledge that $E_0=0$ and $V_0=0$, $$D_p = \frac{-1}{E_3}\left[\frac{\left(\frac{V_1}{E_1}-\frac{V_2}{E_2}\right)}{E_1-E_2} - \frac{\left(\frac{V_1-V_2}{E_1-E_2}-\frac{V_1-V_3}{E_1-E_3}\right)}{E_2-E_3}\right]$$

Environmental Correcting Equation (ECE)

The ECE coefficients define a cubic equation that compensates for the error introduced by temperature, hysteresis, mechanical wear and other unwanted effects. This equation is maintained completely by the WAGalarm—no user actions are necessary for calibration. Since the ECE is dependent on variables that we cannot control, the coefficients for this equation must be calculated as data points become available. The first set of data is the original entry, $(E_0, V_0)$. The second, third and fourth sets will be read when the temperature has changed by a predetermined amount; this should occur within the course of a day. A minute leak test is performed before the values are recorded to ensure that the readings are valid. If the leak test fails, the system will react in its normal manner and remain in the watch state until a flow exists or the system is reset. When things have returned to normal, the data gathering will continue. When all four sets of data have been read, the ECE coefficients are computed to give us a cubic equation. These coefficients remain unchanged until the system is determined to be out of calibration (calibration is checked following every leak test). When recalibration is needed, the system will change the constant value only—this shifts the entire ECE curve to the zero axis.

The readings used to generate the ECE coefficients are, theoretically, free from any variation due to static pressure reduction caused by flow or leak since they are collected following leak tests. In a real system the static pressure may be below the reference point due to drift in the main line. This is accounted for when generating the ECE coefficients. The ECE data points can be read from a temperature dependent and static pressure dependent curve. If the temperature error curve is shown in a graphical view, the invention is recalibrated by shifting the curve so that is crosses the zero axis at the current E reading.

ECE Coefficient Generation

The residual portion of V due to temperature is calculated as:

$$V_{Res} = V_{cur} - V_{Pcr}$$
$$= V(t) - V_0 - V_{Pcr}$$

From this, one can determine the residual E that is due to temperature using iterative means. The following equation is iterated 20 times:

$$E_{Res_n} = \frac{V_{Res} - Ap}{Bp + CpE_{Res_{(n-1)}} + Dp_{Res_{(n-1)}}^2}$$

When the four data sets have been collected, one solves the following equations to get values for $A_T$, $B_T$, $C_T$ and $D_T$.
With the knowledge that $E_{Res_0}=0$, $V_{Res_0}=0$, one can solve the equations using the same method as was done for the SPCE coefficients.

$$D_T \frac{-1}{E_{Res_3}} \left[ \frac{\left(\frac{V_{Res_1}}{E_{Res_1}} - \frac{V_{Res_2}}{E_{Res_2}}\right)}{E_{Res_1} - E_{Res_2}} - \frac{\left(\frac{V_{Res_1} - V_{Res_2}}{E_{Res_1} - E_{Res_2}} - \frac{V_{Res_1} - V_{Res_3}}{E_{Res_1} - E_{Res_3}}\right)}{E_{Res_2} - E_{Res_3}} \right]$$

$$C_T = \frac{1}{E_{Res_2} - E_{Res_3}} \left( \frac{V_{Res_1} - V_{Res_2}}{E_{Res_1} - E_{Res_2}} - \frac{V_{Res_1} - V_{Res_3}}{E_{Res_1} - E_{Res_3}} \right) -$$
$$D_p(E_{Res_1} + E_{Res_2} + E_{Res_3})$$

$$B_T = \frac{V_{Res_2} - V_{Res_3}}{E_{Res_2} - E_{Res_3}} - C_p(E_{Res_2} + E_{Res_3}) -$$
$$D_p\left(E_{Res_2}^2 + E_{Res_3}^2 + E_{Res_2}E_{Res_3}\right)$$

$$A_T =$$

$A_T$ is modified during operation to calibrate the correcting equations to the zero axis.

Pressure Reading Adjustment

All pressure readings are corrected to be relative to the zero point. The following equations convert the sensor reading, V(t), by subtracting the absolute reference and any sensor error. This correction is performed every time a value is read.

If the ECE coefficients have not yet been calculated, one sets $$E_{Tcr}=0$$

$$V_{Tcr}=0$$

otherwise one can calculate the ECE correction as follows:

$$A_i = A_T + B_P E_{cur} + C_P E_{cur}^2 + C_P E_{cur}^3$$

$$B_i = B_T - B_P - 2C_P E_{cur} - 3D_P E_{cur}^2$$

$$C_i = C_T + C_P + 3D_P E_{cur}$$

$$D_i = D_T - D_P$$

Using iterative means, we can find $E_{tcr}$. A very fast convergence is realized by using $E_{tcr}$ from the last reading as our initial value. The following equation is iterated 10 times:

$$E_{Tcr_n} = \frac{V_{cur} - A_i}{B_i + C_i E_{Tcr_{(n-1)}} + D_i E_{Tcr_{(n-1)}}^2}$$

$V_{Tcr}$ is then calculated as:

$$V_{Tcr} = A_T + B_T E_{Tcr} + C_T E_{Tcr}^2 + D_T E_{Tcr}^3$$

The SPCE correction is always applied.

$$E_{Pcr} = E_{cur} - E_{Tcr}$$
$$= E(t) - E_0 - E_{Tcr}$$
$$V_{Pcr} = B_P E_{Pcr} + C_P E_{Pcr}^2 + D_P E_{Pcr}^3$$

When the corrections have been calculated, they are applied to V(t) to give the corrected pressure value that is used in all flow comparisons.

$$P_{ac} = V_{cur} - V_{Pcr} - V_{Tcr}$$
$$= V(t) - V_0 - V_{Pcr} - V_{Tcr}$$

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within its true spirit and scope.

What is claimed is:

1. A method of monitoring or detecting small gas or liquid leaks in a gas or liquid supply system comprising a pipe and having a pilot light comprising:
  i) at a time when the system is leak-free, undertaking a valve open-valve closed test to determine whether there is a flow in the pipe other than due to the pilot light;
  ii) if there is no flow in the pipe other than due to the pilot light, obtaining a signature of the flow in the pipe due to the pilot light by closing the valve in the supply line for a period short enough not to extinguish the pilot light, opening the valve and measuring the fluid flow signature due to the pilot light;
  iii) storing the signature of the flow due to the pilot light in memory;
  iv) later when it is desired to test for leaks, conducting a valve open-valve closed test to determine whether there is a flow in the pipe other than due to the pilot light;
  v) if there is no flow in the pipe other than due to the pilot light, obtaining a measurement of the flow in the pipe by closing the valve in the supply line for a period short enough not to extinguish the pilot light, and then opening the valve and measuring the fluid flow;
  vi) comparing the measured flow to the stored pilot signature flow to determine if a leak exists.

2. The method of claim 1 wherein correction is made in the flow measurement for static pressure.

3. The method of claim 1 wherein correction is made in the flow measurement for temperature.

4. A system for monitoring or detecting small gas or liquid leaks in a gas or liquid supply system comprising a pipe and having a pilot light comprising:
- a) valve for opening and closing the fluid supply line;
- b) control means for controlling the valve;
- c) means for sensing a flow within the supply line;
- d) means for processing data from said sensing means; and
- e) means for storing processed data in non-volatile memory in the control means;

wherein said control means is programmed to carry out the following steps:
- i) at a time when the system is leak-free, undertaking a valve open-valve closed test to determine whether there is a flow in the pipe other than due to the pilot light, and if there is no flow in the pipe other than due to the pilot light obtaining from said sensing means a signature of the flow in the pipe due to the pilot light by closing the valve in the supply line for a period short enough not to extinguish the pilot light, opening the valve and measuring the fluid flow signature due to the pilot light;
- ii) storing the signature of the flow due to the pilot light in memory;
- iii) later when it is desired to test for leaks, conducting a valve open-valve closed test to determine whether there is a flow in the pipe other than due to the pilot light;
- iv) if there is no flow in the pipe other than due to the pilot light, obtaining from said sensing means a measurement of the flow in the pipe by closing the valve in the supply line for a period short enough not to extinguish the pilot light, and then opening the valve and measuring the fluid flow;
- v) comparing the measured flow to the stored pilot signature flow to determine if a leak exists.

\* \* \* \* \*